United States Patent [19]

Kase et al.

[11] Patent Number: 5,064,928
[45] Date of Patent: Nov. 12, 1991

[54] ISOCYANATE PREPOLYMER AND PROCESS FOR PREPARING THE SAME

[75] Inventors: Mitsuo Kase; Kazue Tsuyuzaki, both of Chiba; Yoichi Kawasaki, Ichihara; Shunji Arimoto, Narashino, all of Japan

[73] Assignee: Dainippon Ink and Chemicals, Inc., Tokyo, Japan

[21] Appl. No.: 499,840

[22] Filed: Mar. 27, 1990

[30] Foreign Application Priority Data

Mar. 28, 1989 [JP] Japan ................................. 1-75440

[51] Int. Cl.$^5$ ............................................. C07C 31/18
[52] U.S. Cl. ..................................... 528/85; 524/539; 524/773; 524/871; 523/105; 521/155; 568/853
[58] Field of Search ................... 528/85; 524/539, 773, 524/871, 155; 523/105; 568/853

[56] References Cited

U.S. PATENT DOCUMENTS

| | | | |
|---|---|---|---|
| 4,216,344 | 8/1980 | Rogier | 528/85 |
| 4,404,296 | 9/1983 | Schäpel | 523/105 |
| 4,423,179 | 12/1983 | Guagliardo | 524/539 |
| 4,767,796 | 8/1988 | Cortelek et al. | 521/155 |

*Primary Examiner*—John Kight, III
*Assistant Examiner*—Duc Truonk
*Attorney, Agent, or Firm*—Armstrong, Nikaido, Marmelstein, Kubovcik & Murray

[57] ABSTRACT

The present invention provides an isocyanate prepolymer prepared by reacting an organic di-isocyanate with an unsaturated alcohol dimer having 16 to 24 carbon atoms and/or a hydrogen addition product of the unsaturated alcohol dimer and a process for preparing the same.

6 Claims, No Drawings

ISOCYANATE PREPOLYMER AND PROCESS FOR PREPARING THE SAME

BACKGROUND OF THE INVENTION

1. Field of the Invention

The present invention relates to a novel and useful isocyanate prepolymer and a process for preparing the same. More particularly, the present invention relates to an isocyanate prepolymer for use in a hardener of two-component urethane resin, which is useful for paints, adhesives, and molding materials and processes for preparing the same. The isocyanate prepolymer are synthesized by a reaction between organic di-isocyanates and a relatively long chain unsaturated alcohol dimer such as oleyl alcohol dimer and/or a hydrogen addition product of the unsaturated alcohol dimer.

2. Prior Art

As flexible isocyanate prepolymers for use in hardeners of two-component urethane resin, so-called adduct-type isocyanate prepolymers prepared by addition reaction of organic di-isocyanate with polyether polyols such as polypropylene glycol are known. These kinds of isocyanate prepolymers, however, have an essential drawback with respect to their durability as the intramolecular ether bonds of the isocyanate prepolymers are vulnerable to oxidative deterioration.

Recently, another adduct-type isocyanate prepolymer, prepared by addition reaction of an organic di-isocyanate with a polyester diol, has been used.

Nevertheless, since this kind of isocyanate prepolymer is vulnerable to hydrolysis of the intramolecular ester bonds thereof, cleavage of the ester bonds is especially common. When the isocyanate prepolymers contact alkaline materials such as concrete and the like, the prepolymers have the same durability problem as described in the foregoing case since the ester bonds of the prepolymers are vulnerable to cleavage.

Various isocyanate prepolymers which have been used in a flexible hardener for use in two-component urethane resins have generally a disadvantage in their durability for practical use.

SUMMARY OF THE INVENTION

It is therefore a main object of the present invention to provide a useful isocyanate prepolymer which has none of the drawbacks of conventional isocyanate prepolymers mentioned above, in other words, to provide a flexible, durable, and practical isocyanate prepolymer. Another object of the present invention is to provide a less poisonous isocyanate prepolymer.

A further object of the present invention is to provide a process for preparing less poisonous, more flexible, and more durable isocyanate prepolymers.

According to a first aspect of the present invention, there is provided an isocyanate prepolymer prepared by reacting an organic di-isocyanate with an unsaturated alcohol dimer, each unsaturated alcohol component having 16 to 24 carbon atoms and/or a hydrogen addition product of the unsaturated alcohol dimer.

According to a second aspect of the present invention, there is provided a process for preparing isocyanate prepolymer, comprising the steps of:

(a) reacting at least one kind of alcohol dimer compound selected from the group consisting of an unsaturated alcohol dimer, each unsaturated alcohol component having 16 to 24 carbon atoms and a hydrogen addition product of the unsaturated alcohol dimer with a large excess of organic di-isocyanate;

(b) subsequently removing unreacted organic diisocyanate on the reaction step (a).

DETAILED DESCRIPTION OF THE INVENTION

The present invention provides an isocyanate prepolymer that is prepared by reacting a compound (A) selected from the group consisting of unsaturated alcohol dimers (a-1), each unsaturated alcohol component being of relatively long chains having 16 to 24 carbon atoms and hydrogen addition products of the unsaturated alcohol dimers (a-2), with an excess amount of organic di-isocyanate (B), subsequently removing unreacted organic di-isocyanate (B) from the reaction mixture.

The unsaturated alcohol dimer (a-1), each unsaturated alcohol component having 16 to 24 carbon atoms mentioned above is typically represented by oleyl alcohol dimer, linol alcohol dimer, or dimer of mixture of an oleyl alcohol and linol alcohol.

Also, the hydrogen addition product of the unsaturated alcohol dimer (a 2) is typically represented by hydrogen addition product oleyl alcohol dimer, hydrogen addition product of linol alcohol dimer, or a hydrogen addition product of the dimer of the mixture of oleyl alcohol and linol alcohol.

The above-mentioned organic di-isocyanate (B), which is reacted with at least one of the compounds (A) selected from the group consisting of the foregoing unsaturated alcohol dimer (a-1) and hydrogen addition product of the unsaturated alcohol dimer (a-2), is equivalent to those used conventionally. Classes of the organic di-isocyanate (B) found useful are p phenylene di-isocyanate, m-phenylene di-isocyanate, 2,4-tolylene di-isocyanate, 2,6-tolylene diisocyanate, tetramethylene di-isocyanate, hexamethylene diisocyanate, dodecamethylene di-isocyanate, 3-methylpentane di-isocyanate, 1,4-cyclohexane di-isocyanate, 1,3-bis(isocyanate methyl) cyclohexane, 1,4-bis(isocyanate methyl) cyclohexane, 3-isocyanate methyl-3,5,5-trimethyl cyclohexyl isocyanate, xylene di-isocyanate, and various di-isocyanate mixtures thereof.

The process for preparing the isocyanate prepolymer of the present invention by using the compound (A) and the organic di-isocyanate (B) is carried out by urethane-linking reaction of a compound (A) of the diol composition comprising an unsaturated alcohol dimer (a-1) and/or a hydrogen addition product of the unsaturated alcohol dimer (a-2), with a compound (B) of the di-isocyanate composition, comprising an excess of organic di-isocyanate. In case of using a large excess of the compound (B), an equivalent ratio of the compound (B) to the compound (A), which is represented by the NCO/OH equivalent ratio of the isocyanate group (NCO) of the compound (B) to the hydroxyl group (OH) of the compound (A), must be set in the range of 4 to 25, preferably 5 to 20.

If the urethane-linking reaction is carried out at a NCO/OH equivalent ratio of below 4, the prepared isocyanate prepolymers generally have too high a molecular weight. On the other hand, if the NCO/OH equivalent ratio exceeds 25, the yield of isocyanate prepolymer is reduced in the process for removing the unreacted organic di-isocyanate.

The temperature and the time of urethane-linking reaction in the absence of a catalyst are generally recommended in the range of 50° C. to 150° C. and 3 hours to 10 hours, respectively.

Thus, urethane-linking reaction easily proceeds in the absence of a catalyst.

The remaining unreacted organic di-isocyanate, which exists because of using a large excess of the organic diisocyanate in urethane-linking reaction is removed from the reaction mixture, for example, by using a rotary blade or rotary disk thin film evaporator to readily obtain less poisonous and purer isocyanate prepolymer that contains very small amounts of the unreacted organic di-isocyanate.

The vacuum of the thin film evaporator mentioned above is preferably in the range of 0.03 Torr to 2 Torr, and the evaporation temperature is preferably in the range of 100° C. to 200° C.

The thin film evaporation process is continuously carried out, and the retention time in the evaporator is usually within 30 minutes, preferably as short as possible.

The isocyanate prepolymer obtained after refining evaporation is a viscous fluid or a semi-solid at room temperature. It can be practically stored in the pure state, or as a solution properly diluted by various organic solvents such as hydrocarbon solvents including toluene, xylene, "SWASOL 310" (produced by Maruzen Petrochemical Company Limited) or "Exxon Naphtha No.6" (produced by Exxon Chemical Japan Ltd.); or solvents which are non-reactive with the isocyanate groups such as n-butyl acetate or methyl ethyl ketone.

The isocyanate prepolymer obtained by the process of the present invention is used as a hardener, combined with conventionally used main-agent of polyols such as acrylic polyol and alkyd polyol, as well as fluorocarbon polymer polyol.

The isocyanate prepolymer obtained in the present invention, if desired, can be used as an urethane resin hardener, in combination with conventionally-used polyisocyanates which make durable but not flexible biurets, trifunctional adducts, or isocyanurate polyisocyanates.

The isocyanate prepolymer obtained by a process of the present invention is less poisonous, and in addition, particularly flexible and durable so that it is very useful as a two-component polyurethane coatings hardener.

In the paint field, where flexibility and durability of the paint are extremely important, the two-component urethane paint hardener provides building paints with good flexibility, bending, and elasticity.

Furthermore, the isocyanate prepolymer available by the process of the present invention can be applied to a hardener component for the urethane resin preparation in fields of additives and various molding materials.

Next, the present invention will be described more practically by examples and comparative examples. Hereinafter, all parts and percentages are by weight unless otherwise specified.

[EXAMPLE 1]

In a 2-liter glass flask with four necks equipped with a stirrer, a thermometer, a nitrogen gas inlet tube, and a gas outlet, 1,179 g of hexamethylene di-isocyanate and 500 g of "SOVERMOL J-800" (oleyl alcohol dimer produced by Henkel Hakusui Corporation; hydroxyl value: 170 to 190, iodine value: 15 and over) were heated at 90° C. for 7 hours under a nitrogen atmosphere to induce a urethane-linking reaction at the NCO/OH equivalent ratio of 9.

Subsequently, after the reaction mixture was annealed to room temperature, 1,136 g of the reaction mixture was distilled through a thin film evaporator at 140° C. under a reduced pressure of 0.1 Torr to 0.3 Torr to obtain 507.6 g of a syrup-like isocyanate prepolymer distillate (invert ratio: 44.7 %) and 627.1 g of unreacted hexamethylene diisocyanate (recovery ratio: 55.3 %).

The resulting isocyanate prepolymer (hereinafter the resulting isocyanate prepolymer is referred to by "prepolymer (P-1)") registered a Gardner color scale of 3 and the isocyanate group content was 7.1%.

Subsequently, the prepolymer (P-1) obtained above was mixed with "ACRYDIC CU-1206" (acrylic polyol produced by DIC Co.; nonvolatile content: 50±1%, hydroxyl value: 30±3, solvent "SWASOL 1000" produced by Maruzen Petrochemical Company Limited at a NCO/OH equivalent ratio of 1 (1/1), dried at room temperature, and cured to form a coating film. The film was highly elastic, indicating elongation of more than 50% at −10 ° C.

Furthermore, adding titanium white to the prepolymer (P-1) mixed with "ACRYDIC CU-1206" at a NCO/OH equivalent ratio of 1 (1/1), a white enamel paint with PWC of 40 % was prepared. Subsequently, a cured coating film was formed by drying and hardening the paint at room temperature. At a boiling test in 5 % sodium hydroxide aqueous solution for 8 hours, the film indicated no change at all, retaining its glossiness.

[EXAMPLE 2]

The procedure in Example 1 was repeated using "SOVERMOL J-900" (hydrogen addition product of oleyl alcohol dimer produced by the same company mentioned above; hydroxyl value: 170 to 190, hydrogen addition value: 20 to 65), instead of "SOVERMOL J-800", at the NCO/OH equivalent ratio of 9. An obtained isocyanate prepolymer (hereinafter, the obtained isocyanate prepolymer is referred to by "prepolymer (P-2)") had a Gardner color scale less than 1, an isocyanate group content: 7.1 %, and an invert ratio: 46.5 %.

Subsequently, mixing the prepolymer (P-2) with "ACRYDIC CU-1206" at the NCO/OH equivalent ratio of 1 (1/1) by the same procedure as described in Example 1, a cured clear film was prepared. The film was highly flexible, indicating elongation of more than 50% at −10° C. A cured coating film of the white enamel paint with PWC of 40% showed no change, and retained its gloss during a boiling test in a 5 %-sodium hydroxide aqueous solution.

[EXAMPLE 3]

The procedure in Example 2 was repeated using 1,221 g of 2,4-tolylene di-isocyanate instead of hexamethylene diisocyanate, at the NCO/OH equivalent ratio of 9. An obtained isocyanate prepolymer (hereinafter, the obtained isocyanate prepolymer is referred to by "prepolymer (P-3)") had a Gardner color scale of less than 1 and an isocyanate group content of 6.9 % and an invert ratio of 46.4%.

Subsequently, the same procedure was used as in Example 1. A test of the cured clear film prepared from this prepolymer (P-3) and "ACRYDIC CU-1206" confirmed its flexibility, indicating elongation of more than 50% at −10° C. A cured coating film of the white enamel paint with PWC of 40% indicated no change and retained its gloss when tested.

[COMPARATIVE EXAMPLE 1]

The procedure in Example 1 was repeated using 14.4 parts of 1,4-butane diol, 18.8 parts of 1,6-hexane diol, 7.3 parts of neobenzyl glycol and 49.5 parts of adipic acid in place of "SOVERMOL J-800". This polyester diol was reacted with hexamethylene di-isocyanate to obtain an adduct type isocyanate prepolymer (hereinafter, the prepolymer is referred to by "comparative prepolymer (C-1)") with an isocyanate group content of 7.7%.

Subsequently, the same procedure as in Example 1 was carried out. Results of a test of the cured clear film prepared from the comparative prepolymer (C-1) and "ACRYDIC CU-1206" showed a reasonable elongation of more than 50% at −10° C., but the subsequent test of a cured coating film of the white enamel paint with PWC of 40% showed deterioration of the film, completely removing the film gloss, during an 8 hours boiling in a 5% sodium hydroxide aqueous solution.

As indicated herein, the process of the present invention is capable of preparing a isocyanate prepolymer for use in a hardener valuable to industry since it enhances durability remarkably, something that conventional urethane curing agents have not been able to accomplish.

What is claimed:

1. An isocyanate prepolymer prepared by reacting an organic di-isocyanate with an unsaturated alcohol dimer, each unsaturated alcohol component having 16 to 24 carbon atoms and/or a hydrogen addition product of the unsaturated alcohol dimer.

2. A process for preparing isocyanate prepolymer, comprising the steps of:
    (a) reacting at least one kind of alcohol dimer compound selected from the group consisting of an unsaturated alcohol dimer, each unsaturated alcohol component having 16 to 24 carbon atoms and a hydrogen addition product of the unsaturated alcohol dimer with a large excess of organic di-isocyanate;
    (b) subsequently removing unreacted organic diisocyanate from the reaction step (a).

3. An isocyanate prepolymer recited in claim 1, wherein the unsaturated alcohol having 16 to 24 carbon atoms is oleyl alcohol.

4. A process for preparing isocyanate prepolymer recited in claim 2, wherein the unsaturated alcohol having 16 to 24 carbon atoms is oleyl alcohol.

5. An isocyanate prepolymer recited in claim 1, wherein the organic di-isocyanate having isocyanate groups (NCO) is used in excess to the alcohol dimer compound having hydroxyl groups (OH) by a NCO-/OH equivalent ratio of 4 to 25.

6. A process for preparing an isocyanate prepolymer recited in claim 2, wherein the organic di-isocyanate having isocyanate groups (NCO) is used in excess to the alcohol dimer compound having hydroxyl groups (OH) by a NCO/OH equivalent ratio of 4 to 25.

* * * * *